United States Patent Office 2,838,379
Patented June 10, 1958

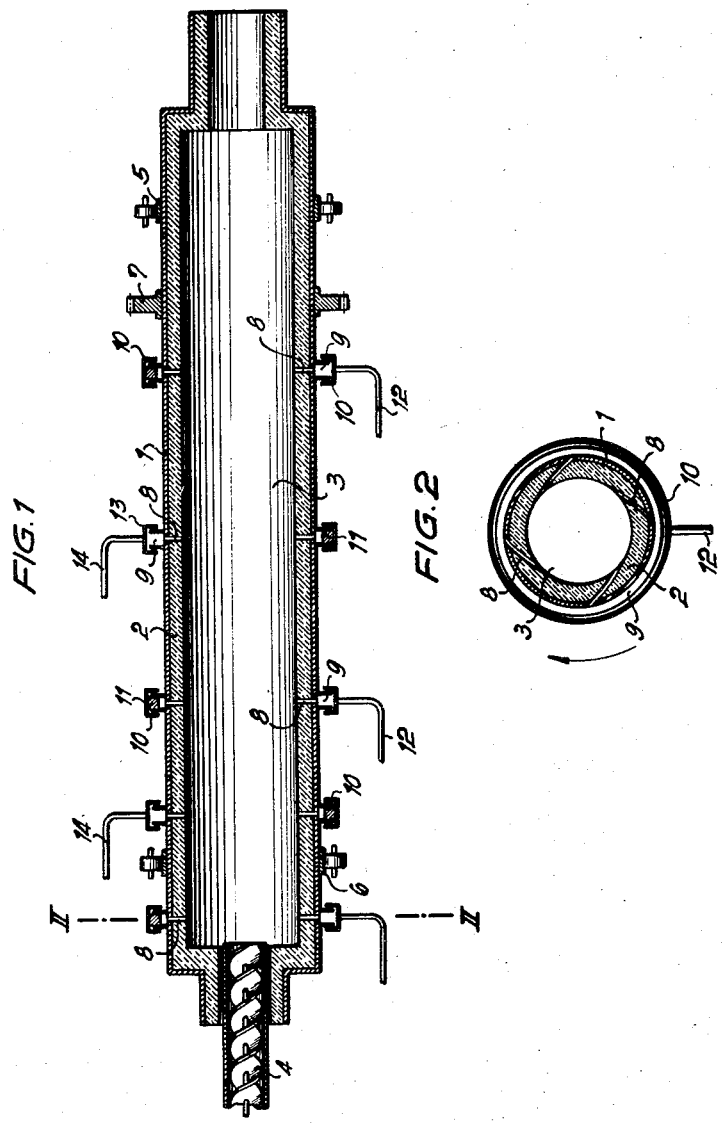

2,838,379

METHOD AND APPARATUS FOR NITROGENATING CALCIUM CARBIDE

Thomas Fischer, Trostberg, Hermann Kronacher, Feldkirchen, near Trostberg, and Franz Kaess, Trostberg, Germany, assignors to Süddeutsche Kalkstickstoff-Werke A. G., Trostberg, Germany Application July 15, 1955, Serial No. 522,344

3 Claims. (Cl. 23—279)

The invention relates to a process and apparatus for preparing calcium cyanamide from calcium carbide.

It is known to perform the nitrogenation of calcium carbide in revolving furnaces, where calcium carbide and nitrogen are introduced at the one end of the furnace and the calcium cyanamide is withdrawn from the other end. Particularly if finely powdered calcium carbide is used as starting material, nests are formed in the mass, which in spite of the revolving movement are not dispersed again but revolve together with the powdery mass and cause formation of clumps and clusters which adhere to the walls of the furnace and interfere with its smooth operation.

It is, therefore, a principal object of the invention to provide a method which prevents or reduces the formation of such nests.

It is a further object of the invention to provide an apparatus suitable for carrying out the process.

Other objects and advantages will be apparent from a consideration of the specification and claims.

According to the invention, the formation of nests in the powdery material is prevented or at least considerably reduced by introducing the nitrogenating gas from the periphery of the rotary kiln into the reaction space. In this way, the gas contacts first the outer side of the charge which adjoins the walls of the kiln and prevents the formation of nests, since at the inner surface of the charge contact between the charge and the gas is always assured. The peripheral admission of the gas whirls up the bed of the material, which very efficiently prevents the formation of nests.

It is of particular advantage to introduce the nitrogenating gas tangentially into the inner circumference of the kiln, preferably in a direction opposite to the direction of rotation of the kiln. In order to avoid loss of nitrogen, the gas is preferably introduced at those portions of the revolving drum which are covered by the charge; at the other portions, it may be introduced mixed with powdered carbide.

A suitable apparatus for the embodiment of our invention is shown by way of example, in the accompanying drawings, wherein Fig. 1 is a longitudinal section of a rotary kiln, and
Fig. 2 is a cross section taken on lines A—B of Fig. 1.

In the drawings, the reference numeral 1 designates a metallic cylinder which is provided with a refractory lining 2 and defines the reaction space 3. A screw conveyor 4 feeds calcium carbide into the front end of the kiln. The kiln rotates on trunnions 5, 6 and is driven by the use of a driving gear 7. The wall 1 and the lining 2 of the kiln are perforated by spaced tangential channels 8, which are located in approximately the same plane and open in annular chambers 9 located at the outer periphery of the kiln. The annular chambers 9 are enclosed by sealing rings 10, into the bottom of which open pipes 12 for the admission of nitrogen. At their upper periphery, said sealing rings 10 are provided with sealing members 11, which cause the nitrogen to enter the chamber 3 only in the lower portion of the periphery which carries the bed of the charge. Other sealing rings 13 are provided in the lower portion with semi-circular sealing members 11 and receive the gas admission pipes 14 in their upper portion. Such pipes 14 are used to introduce a mixture of nitrogen and carbide dust. The rings 13 and 14 are stationary, whereas the kiln 1, 2 rotates.

The channels 8 may be provided only in the end of the kiln adjoining the screw conveyor 4. However, they may be also distributed over a greater length of the kiln, as shown in the drawing. In this case, the cross-sections of the various channels 8 may decrease from the screw 4 in direction of the opposite end of the kiln in order to reduce gradually the amount of admitted nitrogen towards the end of the reaction zone, or other means may be provided to the same effect.

The described arrangement ensures that the nitrogenating agent, that is the nitrogen, is introduced into the side of the reacting bed which faces the wall of the kiln. In this way, the formation of nests is substantially prevented, particularly due to the turbulence imparted to the bed. The stirring, and consequently the conversion of the bed is assisted by the tangential arrangement of the channels 8, which preferably extend in a direction opposite to the direction of rotation of the kiln. The top zones of the kiln periphery do not receive nitrogen but a mixture of nitrogen and calcium carbide; in this way, the reaction space is better utilized and nitrogen is also supplied to the surface of the bed.

The following example is given to illustrate a preferred method of carrying out the invention, it being understood that the invention is not limited to the details set forth in the example. Proportions are given by weight.

Example

A kiln as shown in the drawing, having an inner diameter of 2.5 m. and a length of 11 m. was fed with 3 metric tons per hour of the following charge:

| | Percent |
|---|---|
| $CaC_2(80\%)$ | 75 |
| $CaCN_2$ | 23 |
| $CaF_2$ | 2 |

The screen analysis of the charge was 85% through a screen having 4900 meshes per $cm.^2$.

A total amount of 800 $m.^3$ of nitrogen per hour was introduced through the tangential channels 8. The temperature at the beginning of the reaction was about 1000–1020° C., at the end about 900° C. The time of the run of the charge through the kiln was about 4 hours.

The end product leaving the kiln was substantially free of residual carbide and contained 24 to 25 percent by weight of nitrogen, corresponding to a yield of about 94%.

The kiln was inclined from the feed end to the discharge end by an angle of 2 degrees against the horizontal plane.

We claim:

1. An apparatus for nitrogenating calcium carbide comprising a rotary kiln, means to feed calcium carbide to one end of said kiln, means to withdraw calcium cyanamide from the other end of said kiln, spaced peripheral annular chambers on the outer periphery of the kiln, channels in the wall of the kiln connecting said annular chambers with the inside of the kiln, stationary rings sealing said annular chambers against the atmosphere, and means for admitting gas through said rings into said chambers.

2. An apparatus as claimed in claim 1, wherein said channels open tangentially into the kiln.

3. An apparatus as claimed in claim 1, including means closing parts of the annular space of said annular chambers.

References Cited in the file of this patent

UNITED STATES PATENTS

| 658,727   | Naef        | Sept. 25, 1900 |
| 2,091,850 | Gohre       | Aug. 31, 1937  |
| 2,161,328 | Winter et al. | June 6, 1939 |